United States Patent
Zanarini et al.

(10) Patent No.: US 8,148,849 B2
(45) Date of Patent: Apr. 3, 2012

(54) SOLAR INVERTER AND PLANT FOR CONVERTING SOLAR ENERGY INTO ELECTRICAL ENERGY

(75) Inventors: Sergio Zanarini, Casalfiumanese (IT); Riccardo Morici, Castelmaggiore (IT)

(73) Assignee: Elettronica Santerno S.p.A., Campodarsego (IT)

( * ) Notice: Subject to any disclaimer, the term of this patent is extended or adjusted under 35 U.S.C. 154(b) by 301 days.

(21) Appl. No.: 12/444,809

(22) PCT Filed: Oct. 11, 2007

(86) PCT No.: PCT/EP2007/060834
§ 371 (c)(1),
(2), (4) Date: Apr. 8, 2009

(87) PCT Pub. No.: WO2008/043814
PCT Pub. Date: Apr. 17, 2008

(65) Prior Publication Data
US 2010/0007212 A1    Jan. 14, 2010

(30) Foreign Application Priority Data
Oct. 13, 2006  (IT) .............................. PD2006A0382

(51) Int. Cl.
*H02J 1/00* (2006.01)
(52) U.S. Cl. .......................................................... 307/82
(58) Field of Classification Search .................... 307/82, 307/76, 51
See application file for complete search history.

(56) References Cited

U.S. PATENT DOCUMENTS

| 6,545,211 B1 * | 4/2003 | Mimura ........................ 136/244 |
| 7,250,231 B2 * | 7/2007 | Edlund .......................... 429/429 |
| 2005/0139258 A1 * | 6/2005 | Liu et al. ....................... 136/293 |

FOREIGN PATENT DOCUMENTS

| EP | 1 326286 A | 7/2003 |
| JP | 2000 164906 A | 6/2000 |
| JP | 2000164906 | 6/2000 |
| JP | 2002367046 | * 12/2002 |

OTHER PUBLICATIONS

International Search Report and Written Opinion of related PCT application PCT/EP2007/060834 (dated Dec. 12, 2007).
International Preliminary Report on Patentability of related PCT application PCT/EP2007/060834 (dated Aug. 3, 2009).

* cited by examiner

*Primary Examiner* — Jared Fureman
*Assistant Examiner* — Toan Vu
(74) *Attorney, Agent, or Firm* — Castellano PLLC; Kristina Castellano

(57) ABSTRACT

There is described a plant (1) for converting solar energy into electrical energy, comprising a photovoltaic generator (2a) including at least one string (2) of photovoltaic modules (M), a pulse generator (31) able to send electrical pulses to the input of the string (2), a signal detector (OP) arranged at the output of the string (2) and able to detect, at the output of the string (2), the presence of a signal which is a function of the electrical pulses at the input, and alarm means connected to the signal detector (OP) and able to generate an alarm in the event that there is no signal at the output of the string (2).

12 Claims, 2 Drawing Sheets

SOLAR INVERTER AND PLANT FOR CONVERTING SOLAR ENERGY INTO ELECTRICAL ENERGY

CLAIM FOR PRIORITY

This application is a U.S. National Stage Application of PCT/EP2007/060834 filed on Oct. 11, 2007, claiming priority to Italian application PD2006A000382 filed Oct. 13, 2006, the contents of both of which are incorporated herein by reference.

TECHNICAL FIELD

The present invention relates to a solar inverter, able to convert direct current, from solar panels or other systems for converting solar energy into electrical energy, into alternating current and to a plant for converting solar energy into electrical energy. In particular, the invention comprises an antitheft device arranged in the inverter and/or in the above-mentioned plant.

TECHNOLOGICAL BACKGROUND

In known plants for converting solar energy into electrical energy, it is known that the items which have a high associated cost, and which therefore have a profound impact on the overall cost of the plant, are the photovoltaic cells, forming "solar panels" which, when irradiated, convert solar energy into electrical energy by virtue of the material from which they are made and which contains silicon. Several photovoltaic cells connected together are referred to as a "module" or "panel", and the latter are connected in series in the intended area. The various modules can be easily dismantled, or separated from one another, thereby giving the plant flexibility for adding or removing, as desired, the modules in order to vary as needed the production of electrical energy and to customize the plant itself. Plants of differing power levels can thus be produced with the same type of module.

Conversion plants are generally installed in areas exposed to the sun, outdoors (on roofs, on patio areas, on the ground, etc.), and may cover extensive surface areas.

Due to the modular nature of panels, and their high cost, there is a substantial problem of theft of panels inside plants. Indeed, the panels can easily be resold and reused without modifying them.

To address this drawback, since constant monitoring by security officers of plants is extremely costly, which plants may even be in locations that are remote or difficult to access, standard antitheft systems that are also employed in other fields are used in the prior art, for example the use of closed circuit television cameras.

However, even this type of antitheft monitoring system is particularly expensive, especially in the case of small plants and/or ones for domestic use, in which the antitheft system would arrive at a cost of the same order of magnitude as that of the conversion plant.

A monitoring system for monitoring possible malfunctions of a solar plant is described by EP 1 326 286, and U.S. Pat. No. 6,545,211, nevertheless such systems are not suitable for functioning as anti theft system.

Moreover the system according to EP 1 326 286 is so configured as to function only during solar irradiation, i.e. during the functioning of the solar plant.

Moreover, JP 2000 164906, describes a theft detection circuit for solar battery comprising a current supply sources separated form solar batteries, and theft sensing detecting circuit by means of which a current is made to flow through solar batteries.

The system according to JP 2000 164906 may be used only at low voltage level and requires a dedicated power system.

Therefore the need arises of an anti theft system for solar cell plant being reliable, and having low energy consumptions.

Moreover an anti theft system is required so configured as to function either during solar irradiation and also during night or when no solar irradiation reach the cells.

SUMMARY OF THE INVENTION

A main aim of the present invention is to provide a solar inverter and a plant for converting solar energy into electrical energy which are structurally and functionally designed to meet the requirements indicated, at the same time overcoming the limits highlighted with reference to the cited prior art.

This and other aims, which will become clear below, are achieved by a solar inverter and a plant for converting solar energy into electrical energy, produced in accordance with the accompanying claims.

BRIEF DESCRIPTION OF THE DRAWINGS

Other features and advantages of the invention will become clear from the following detailed description of one of its preferred embodiments illustrated, by way of indication and in a non-limiting manner, with reference to the appended drawings in which.

DETAILED DESCRIPTION

Figure 1:
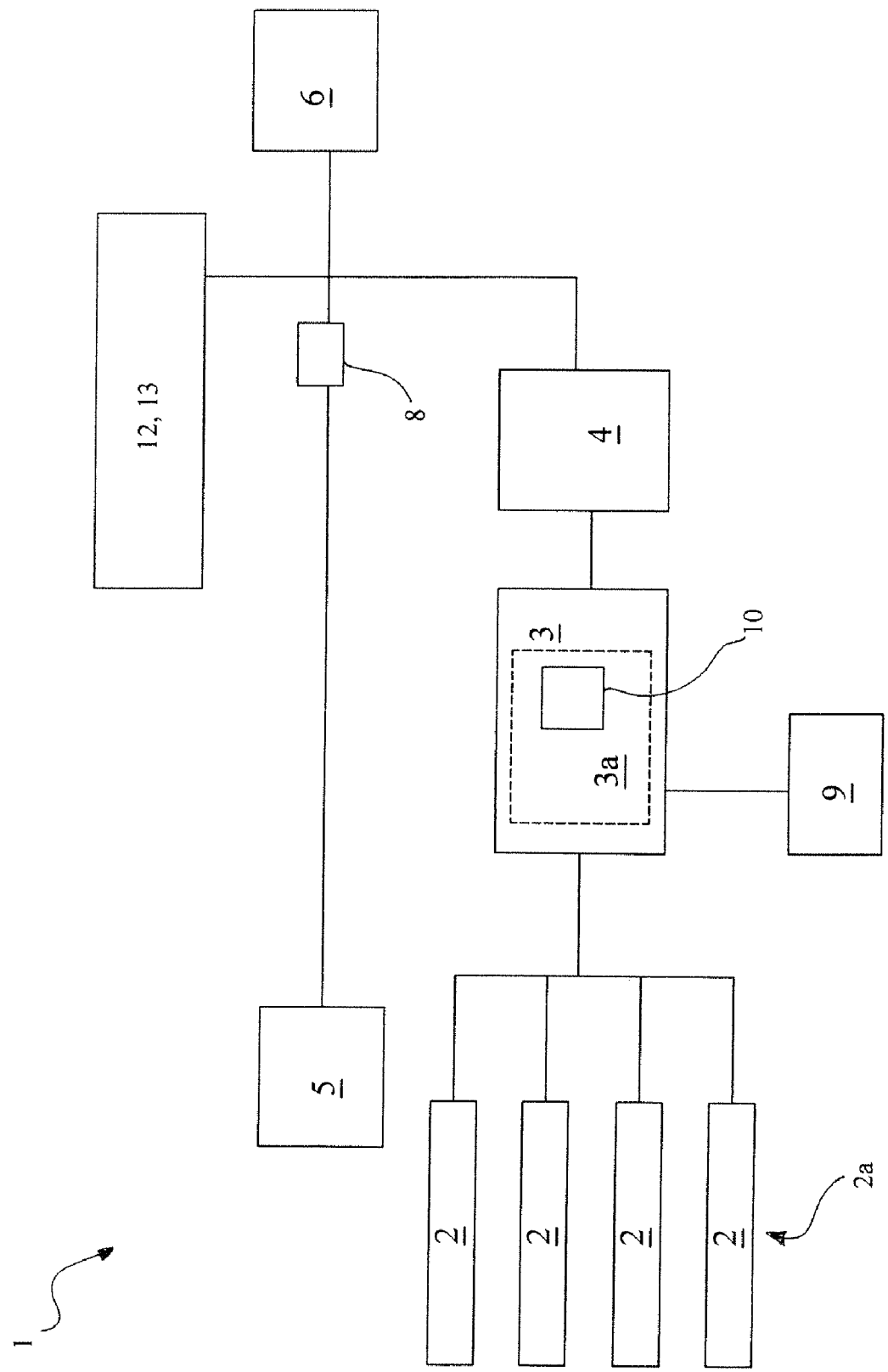
FIG. 1 is a simplified schematic view of a plant for converting solar energy into electrical energy according to the invention.

In the drawings, the reference 1 indicates, as a whole, a plant for converting solar energy into electrical energy and produced in accordance with the present invention.

The plant in question is able to convert solar energy into electrical energy that can be used both to supply the electrical power grid (grid-connected plant) and alternatively (or additionally) to store energy in rechargeable batteries (standalone plant) or similar.

In detail, with reference first to FIG. 1, the plant 1 comprises one or more strings 2 (in the appended drawings, N strings are represented) of solar modules, each string being formed by a plurality of solar modules M, electrically connected together in series.

Each module M (visible in FIG. 2), as is known, is made up of photovoltaic cells. The number of modules and/or strings and the type of cell used forming the module depend on various factors, including the overall power of the plant, the way it is arranged, the radiation level present in the area, etc. In the case of small plants 1, for example a domestic plant, only one string 2 may be present.

The strings 2 are electrically connected together in parallel and the whole assembly thus formed is referred to as a "photovoltaic generator" 2a.

Each string 2 preferably terminates with a junction box (not represented) which functions as an interface between the string and the devices of the plant 1 that follow the string. The box optionally contains protective devices, such as for example blocking diodes or fuses 30 (see for example FIG. 2, explained below), one per string 2, which prevent a reversal of polarity in the string 2. These protective devices are not necessary if the strings are not subjected to shade.

Additionally, reading means 15 are provided if necessary, connected to each string, in particular arranged at the output of each string 2, in order to read and if necessary store the current produced by each individual string 2 over a unit of time. Preferably such reading means 15 are current sensor devices connected to microprocessors.

Also optionally, the junction boxes can contain variators and/or arrestors for protection from lightning surges, fuses for protection from power surges, etc.

Each string 2, when irradiated by the sun, produces direct current which is added to the direct current produced in the remaining strings.

Downstream of the strings 2, the plant 1 comprises a conversion group 3, able to convert the direct current produced by the photovoltaic generator 2a into alternating current, preferably into alternating current having a frequency and voltage equal to those of the current in the electrical power grid of the country in which the plant 1 is implemented. Alternatively, in the case of a standalone solar plant 1, the direct current produced by the photovoltaic generator is stored in batteries without conversion to AC.

In the case of grid-connected or mixed plants, the conversion group 3 comprises an inverter 3a, which performs the conversion for example by means of a Pulse Width Modulation (PWM) technique. Optionally, the inverter 3a contains one or more Maximum Power Point Trackers (MPPTs) for the photovoltaic generator, which are devices that maximize the power that can be transferred from the photovoltaic generator.

Furthermore, in a preferred example embodiment of the inventor, there is arranged downstream of the inverter 3a a transformer 4 to ensure complete isolation between the photovoltaic generator 2a and the electrical power grid connected at the output.

The inverter 3a preferably comprises a control unit 10 for the management, among other tasks, of information from the individual strings 2, such as for example the readings of the amount of current produced by the photovoltaic generator 2a and taken by the reading means associated with each string 2. This information is also used to detect the presence of a possible failure in a determined string 2, in which case the string 2 does not send a current signal for a prolonged period of time, while energy is being produced in the other strings.

The inverter 3a is connected at its output preferably to the electrical power grid and to the consumer, schematically represented by blocks 5 and 6 in FIG. 1. Therefore the AC electrical power produced by the plant 1 is either used by the consumers (if necessary with the addition of power from the electrical power grid if the power generated by the plant 1 is not sufficient for the demands of the consumer in that determined time interval) or supplied to the general electrical power grid, preferably with the same phase of current supplied by the latter. Conveniently, a metering means 8 is therefore provided for calculating, displaying and memorizing the quantity of energy supplied to the electrical power grid 5.

Alternatively or in addition, the plant 1 also comprises an accumulation system 9, such as an energy accumulator or battery, to make the electrical current generated by the photovoltaic generator 2a available even in the case of a blackout on the electrical power grid. In that case, for example, the inverter 3a powers the consumer by drawing energy from the photovoltaic generator 2a and/or from the accumulation system 9.

Moreover, it is possible to provide inverters 3a which convert the DC electrical power supplied by the photovoltaic generator 2a into a three-phase AC voltage with variable frequency, able to power for example a water pump or other type of electric motor.

As can therefore be deduced from the abovementioned preferred embodiments, the specific purpose of the plant 1 is non-limiting for the application of the present invention, and can be the most varied, and similarly the types of photovoltaic generators 2a and inverters 3a used are irrelevant. Furthermore it is possible for the plant 1 to use not only energy from a photovoltaic generator, but also other types of energy, preferably from renewable sources, such as for example a wind power generator.

The management and control of the plant 1 is conveniently performed by a monitoring system, for example a personal computer 12 and/or a mobile phone and/or a hand-held computer 13 to which is sent all the information relating to the operation of the plant 1 or alternatively relating to the operation of the inverter 3a. The monitoring system can also comprise, in addition or as an alternative, a display unit (not represented) including indicator lights in which messages relating to the system state or operational state are displayed. The display unit can be placed on the inverter 3a.

The data transmission protocol used for transmitting data between the plant 1 (or inverter 3a) and the monitoring system is for example of a serial type, preferably a MODBUS protocol; however, any other type of transmission known in the field can be employed; furthermore, provision is also made for the possibility of remotely controlling the plant 1 (or inverter 3a) by sending signals, for example for loading a new program.

Figure 2:
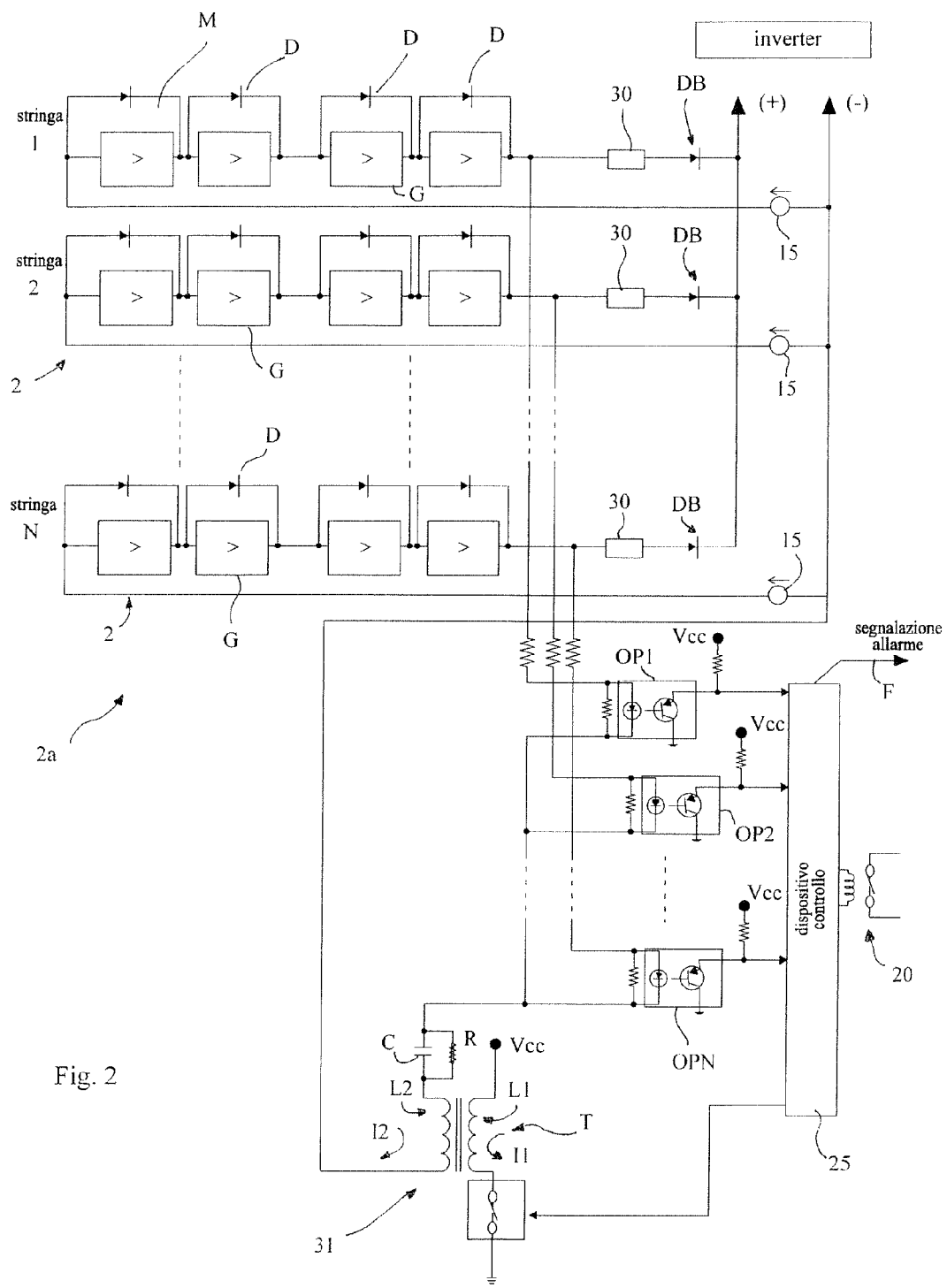
FIG. 2 is a circuit diagram of a preferred embodiment of the control board of the plant of FIG. 1.

According to a main feature of the invention, referring now to appended FIG. 2, the plant 1 comprises, furthermore, an antitheft system 100 able to send an alarm signal to the monitoring system of the plant 1 in the event that one or more of the solar modules M forming one of the strings 2 is removed.

As mentioned above, each module M of a string 2 of the photovoltaic generator 2a can be represented as a current generator to which a diode is connected in parallel. Therefore a string 2 has, as "electrical equivalent", a plurality of diodes connected together in series, each referenced D in FIGS. 2 and 3, and each in parallel with a current generator G. At the output of the string 2 there is placed, as mentioned above, a blocking diode DB to prevent a reversal of current on strings in which there is a short circuit or no illumination.

If one or more modules are removed from the string 2, the equivalent circuit becomes substantially an open circuit (the removed module M "opens" the circuit) and no electrical signal can pass through the string 2. If instead a module M breaks, generally the section corresponding to the broken module is electrically equivalent to a short-circuit and therefore even in this case the current from the other modules of the string 2 can nevertheless pass through the entire string 2 and reach the inverter 3a. Alternatively, if the breakage of a module M turns out to be equivalent to an open circuit, the current nevertheless passes through the corresponding diode D.

Therefore by sending a preset signal, described below, to each string 2 of the generator 2a, and detecting the output response signal from the string 2 as a result of the sent preset signal, the presence or absence of all the modules M forming the string 2 can be detected since if any of them is absent, no response signal (which must pass through the entire string to reach the output) would be obtained as result of any sent preset signal.

According to the invention, the antitheft system 100, preferably incorporated inside the control unit 10 of the inverter 3a, where present, includes a pulse generator 31 to send pulses to the input of the photovoltaic generator 2a. In particular, for each string 2 a pulse generator 31 is provided, able to send pulses to a single string 2. Alternatively, as represented schematically in FIG. 2, a single pulse generator 31 can be present if all the strings 2 of the photovoltaic generator 2a comprise the same number of modules M.

The pulse generator 31 preferably comprises a transformer T, including a primary winding L1 and a secondary winding L2. The primary winding L1 is electrically connected to an alternating wave generator 16, for example a square-wave or sinewave generator, for example a port of a suitably programmed microprocessor, or to an electronic switch (for example a transistor or a MOSFET) and to a DC generator Vcc. The secondary winding L2 is, on the other hand, electrically connected to the string 2 so as to send to the string 2 the pulses from the primary winding L1. Thus current through the winding L2 is limited according to the control characteristics (in particular the duration of the pulses) and independently of the number of modules M of a string 2.

The use of a pulse signal, which is therefore substantially alternating rather than DC, means that the antitheft device 100 can even be used while the strings 2 are being irradiated (and therefore producing direct current).

Preferably, a resistor R and a capacitor C connected together in parallel are placed between the string 2 and the secondary winding L2 of the transformer in order to prevent any DC component of the sent signal from passing through, allowing only an alternating component.

As regards the form of the pulses sent by the generator 31, these are preferably fixed energy constant current pulses. For example, a pulse of about 10 mJ can be sent to each string circuit, and this is achieved considering for example a plant of 50 panels in series (50 diodes D) per string 2, which therefore results in a 50 mA pulse having a duration of 300 µs. The antitheft circuit 100 provides for keeping the current constant, in the sense that if the number of panels per string is reduced, the pulse duration is automatically increased, but the peak current remains constant. Preferably, as illustrated in FIG. 2, the transformer T used is connected in a configuration known in the cited field as "flyback" and this intrinsically enables the regulation of the current described above.

The pulses can be sent at a preset frequency (for example one pulse every second) or at random time intervals.

Connected electrically at the output of the string 2, the antitheft system 100 comprises a signal detector, preferably an optoisolator OP able to check for the presence of an AC pulse at the output of the string 2. Preferably there is one optoisolator OP per string 2 (therefore for N strings, N optoisolators OP1, . . . , OPN are indicated). Other pulse detectors known in the field can be employed in the present invention, such as for example an amperometric transformer or a shunt resistor.

The optoisolator OP is powered by a DC source, such as for example a battery Vcc. Preferably the battery Vcc is recharged while the photovoltaic generator 2a is operating (i.e. when the latter is irradiated).

When the LED of the optoisolator OP has received a current pulse, the transistor of the optoisolator transmits a corresponding signal.

The antitheft system 100 also comprises a control device 25, for example a microprocessor, to which the signals from the optoisolators OP1, . . . , OPN are sent.

The antitheft system 100 is configured such that when a preset number of pulses output by the string 2 is not received by the optoisolator, this preset number being a parameter that is variable and configurable via the control device 25, an alarm is sent by the control device 25 to the monitoring system of the plant 1 by means of alarm means (not represented). In FIG. 2 there is represented an arrow F leaving the control device 25, and this indicates the transmission of the alarm signal to the monitoring system. The latter being the most varied in type, the alarm means are selected and configured so as to send the signal according to the type of monitoring system employed.

The antitheft system 100 described here can even optionally be connected to a standard alarm/anti-intrusion control unit, known in the cited field, for managing and displaying the signal from the alarm in the most appropriate way. For example, the alarm can be communicated to the monitoring system of the plant by means of a break relay contact 20 or through an asynchronous serial MODBUS connection (i.e. RS485 interface; not represented).

From the circuit of FIG. 2, it is clear that there is also no pulse at the output of the optoisolator OP if the voltage Vcc is equal to zero, for example due to a fault. Furthermore, an alarm signal is also sent when there is deliberate damage to the equipment or when the relay 20 has not been deactivated.

The present invention therefore achieves the proposed aims, attaining numerous advantages over the cited prior art.

In particular, a relatively inexpensive antitheft system can be used to constantly monitor the presence or otherwise of all the modules in each string.

Other energy sources are not used since the antitheft system is powered by storing energy from the photovoltaic generator.

It is possible to couple the antitheft system of the invention to antitheft/anti-intrusion control systems that are commercially available at the present time.

The invention claimed is:

1. A plant for converting solar energy into electrical energy, comprising:
    a photovoltaic generator including at least one string of photovoltaic modules,
    a pulse generator able to send electrical pulses to an input of the at least one string,
    a signal detector arranged at an output of the at least one string and able to detect, at the output of the at least one string, the presence of a signal which is a function of the electrical pulses at the input, and
    alarm means connected to the signal detector and able to generate an alarm in the event that there is no signal at the output of the at least one string,
    the pulse generator comprising an alternating wave generator and a transformer, the alternating wave generator being electrically connected to a first winding of the transformer and the at least one string being electrically connected to a second winding of the transformer, wherein the transformer is connected in a flyback configuration.

2. The plant according to claim 1, wherein the electrical pulses at the input of the at least one string are fixed energy constant current pulses.

3. The plant according to claim 1, wherein the electrical pulses are sent at a preset frequency.

4. The plant according to claim 1, wherein the electrical pulses are sent at random time intervals.

5. The plant according to claim 1, wherein the signal detector comprises an optoisolator device.

6. The plant according to claim 1, further comprising a monitoring system to which the alarm generated by the alarm means is sent, and means of communication between the monitoring system and the alarm means comprising a serial connection.

7. An inverter for converting direct current from a photovoltaic generator into alternating current, comprising at least one string of photovoltaic module, and comprising an anti-theft system comprising a pulse generator able to send electrical pulses to an input of the at least one string, a signal detector arranged at an output of the at least one string and able to detect, at the output of the at least one string, the presence of a signal which is a function of the electrical pulses at the input, and alarm means connected to the signal detector and able to generate an alarm in the event that there is no signal at the output of the at least one string, the pulse generator comprising an alternating wave generator and a transformer, the alternating wave generator being electrically connected to a first winding of the transformer and the at least one string being electrically connected to a second winding of the transformer, wherein the transformer is connected in a flyback configuration.

8. The inverter according to claim 7, in which the electrical pulses at the input of the at least one string are fixed energy constant current pulses.

9. The inverter according to claim 7, wherein the electrical pulses are sent at a preset frequency.

10. The inverter according to claim 7, wherein the electrical pulses are sent at random time intervals.

11. The inverter according to claim 7, wherein the signal detector comprises an optoisolator device.

12. The inverter according to claim 7, further comprising a monitoring system to which the alarm generated by the alarm means is sent, and means of communication between the monitoring system and the alarm means comprising a serial connection.

* * * * *